United States Patent
Craggs et al.

(10) Patent No.: US 12,052,359 B2
(45) Date of Patent: Jul. 30, 2024

(54) ENCRYPTION KEY ROTATION

(71) Applicant: AppDirect, Inc., San Francisco, CA (US)

(72) Inventors: Daniel P. Craggs, Montreal (CA); Jonathan David Fok kan, Montreal (CA)

(73) Assignee: AppDirect, Inc., San Francisco, CA (US)

( * ) Notice: Subject to any disclaimer, the term of this patent is extended or adjusted under 35 U.S.C. 154(b) by 335 days.

(21) Appl. No.: 17/390,670

(22) Filed: Jul. 30, 2021

(65) Prior Publication Data

US 2023/0031380 A1    Feb. 2, 2023

(51) Int. Cl.
*H04L 29/06*    (2006.01)
*G06F 18/214*    (2023.01)
*G06N 20/00*    (2019.01)
*H04L 9/08*    (2006.01)
*H04L 9/32*    (2006.01)

(52) U.S. Cl.
CPC .......... *H04L 9/0891* (2013.01); *G06F 18/214* (2023.01); *G06N 20/00* (2019.01); *H04L 9/3236* (2013.01); *H04L 9/3297* (2013.01)

(58) Field of Classification Search
None
See application file for complete search history.

(56) References Cited

U.S. PATENT DOCUMENTS

| | | |
|---|---|---|
| 10,701,094 B2 | 6/2020 | Kirti et al. |
| 10,873,450 B2 | 12/2020 | Keselman et al. |
| 2008/0212770 A1* | 9/2008 | Satou ............... H04L 9/0643 380/44 |

(Continued)

FOREIGN PATENT DOCUMENTS

JP    2012065123 A   *   3/2012

OTHER PUBLICATIONS

Chin, J., "Detecting Threats and Anomalies in your Kubernetes Clusters in Multicloud environments," retrieved on Jul. 22, 2021, from https://jonachin.medium.com/detecting-threats-and-anomalies-in-your-kubernetes-clusters-in-multicloud-environments-519bce310f08, 7 pgs.

(Continued)

*Primary Examiner* — Andrew J Steinle
(74) *Attorney, Agent, or Firm* — McDermott Will & Emery LLP

(57) ABSTRACT

Various aspects of the subject technology relate to systems, methods, and machine-readable media for encrypting data. The method includes adding a new encryption key for encrypting and/or decrypting data of a database, the data previously encrypted by an old encryption key. The method also includes hashing the new encryption key to generate a new hash. The method also includes comparing the new hash and an old hash with values in an encryption log, the old hash generated by hashing an old encryption key. The method also includes in response to the comparing, decrypting the data with the old encryption key when the new hash and old hash match the values in the encryption log. The method also includes encrypting the data with the new encryption key. The method also includes adding a new entry into the encryption log, the new entry comprising the new hash.

20 Claims, 6 Drawing Sheets

(56) References Cited

U.S. PATENT DOCUMENTS

2018/0375886 A1* 12/2018 Kirti ................... H04L 63/1433
2019/0149320 A1*  5/2019 Keselman ............. G06F 16/248
                                                          380/279
2019/0379534 A1* 12/2019 Crowley ............... H04L 9/0894

OTHER PUBLICATIONS

US/RO—International Search Report and Written Opinion mailed Dec. 13, 2022 for related International Application No. PCT/US2022/038580, 8 pgs.

\* cited by examiner

ENCRYPTION KEY ROTATION

TECHNICAL FIELD

The present disclosure generally relates to encrypting data, and more particularly to encryption keys for encrypting data.

BACKGROUND

Data security is important for protecting digital data from undesirable destructive events, such as cyberattacks or data breaches. This has become increasingly more important in the modern age, as the world has become more connected and reliant on digital data. Data encryption protects digital data and is an important tool for data security. However, data encryption requires using encryption keys, which may become outdated or otherwise compromised over time.

BRIEF SUMMARY

The subject disclosure solves this problem by providing for systems and methods for rotating encryption keys. In one embodiment, an encryption rotation request may be received by an application. The application may have either one or more old secrets (e.g., old encryption keys) and/or a new secret (e.g., a new encryption key) available at runtime. The application may hash all the secrets, and may compare the values in an encryption log. If there is no log available, the application may assume that all data is encrypted with the old secret. If there is a log available, the application checks which, if any, data is pending rotation. The application rotates the data by decrypting the database data with the key that matches the encryption log's current secret key hash. The application may then re-encrypt the data with the new secret key. The application may also add a new entry to the encryption log with a hash of the new secret key. According to additional embodiments, the rotation of the encryption keys may include a just-in-time (JIT) secret rotation.

According to one embodiment of the present disclosure, a computer-implemented method for encrypting data is provided. The method includes adding a new encryption key for encrypting and/or decrypting data of a database, the data previously encrypted by an old encryption key. The method also includes hashing the new encryption key to generate a new hash. The method also includes comparing the new hash and an old hash with values in an encryption log, the old hash generated by hashing an old encryption key. The method also includes in response to the comparing, decrypting the data with the old encryption key when the new hash and old hash match the values in the encryption log. The method also includes encrypting the data with the new encryption key. The method also includes adding a new entry into the encryption log, the new entry comprising the new hash.

According to one embodiment of the present disclosure, a system is provided including a processor and a memory comprising instructions stored thereon, which when executed by the processor, causes the processor to perform a method for encrypting data. The method includes adding a new encryption key for encrypting and/or decrypting data of a database, the data previously encrypted by an old encryption key. The method also includes hashing the new encryption key to generate a new hash. The method also includes comparing the new hash and an old hash with values in an encryption log, the old hash generated by hashing an old encryption key. The method also includes in response to the comparing, decrypting the data with the old encryption key when the new hash and old hash match the values in the encryption log. The method also includes encrypting the data with the new encryption key. The method also includes adding a new entry into the encryption log, the new entry comprising the new hash.

According to one embodiment of the present disclosure, a non-transitory computer-readable storage medium is provided including instructions (e.g., stored sequences of instructions) that, when executed by a processor, cause the processor to perform a method for encrypting data. The method includes adding a new encryption key for encrypting and/or decrypting data of a database, the data previously encrypted by an old encryption key. The method also includes hashing the new encryption key to generate a new hash. The method also includes comparing the new hash and an old hash with values in an encryption log, the old hash generated by hashing an old encryption key. The method also includes in response to the comparing, decrypting the data with the old encryption key when the new hash and old hash match the values in the encryption log. The method also includes encrypting the data with the new encryption key. The method also includes adding a new entry into the encryption log, the new entry comprising the new hash.

According to one embodiment of the present disclosure, a system is provided that includes means for storing instructions, and means for executing the stored instructions that, when executed by the means, cause the means to perform a method for encrypting data. The method includes adding a new encryption key for encrypting and/or decrypting data of a database, the data previously encrypted by an old encryption key. The method also includes hashing the new encryption key to generate a new hash. The method also includes comparing the new hash and an old hash with values in an encryption log, the old hash generated by hashing an old encryption key. The method also includes in response to the comparing, decrypting the data with the old encryption key when the new hash and old hash match the values in the encryption log. The method also includes encrypting the data with the new encryption key. The method also includes adding a new entry into the encryption log, the new entry comprising the new hash.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

Figure 1:
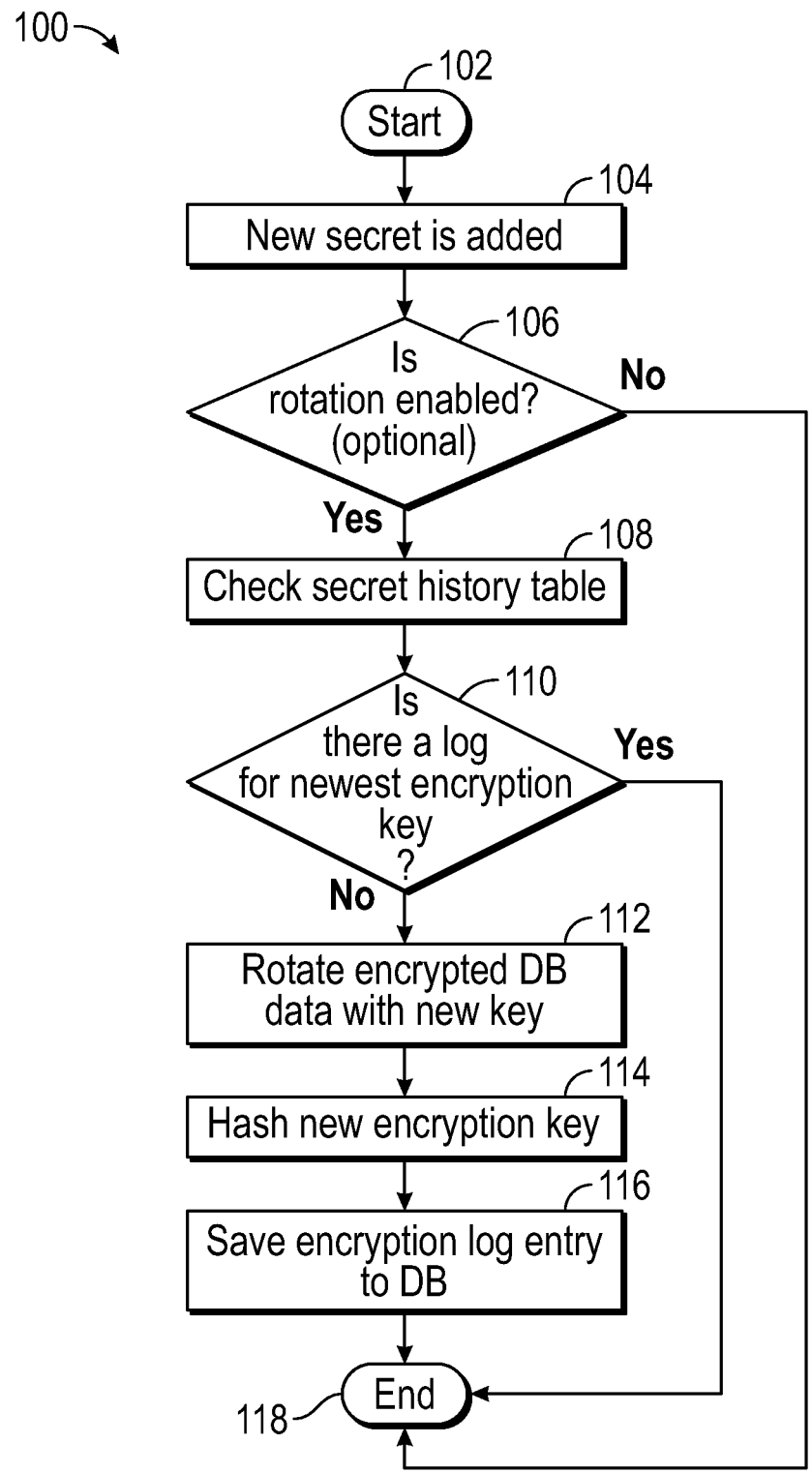
FIG. 1 illustrates an exemplary process flow for rotating encryption keys, according to certain aspects of the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

In the following detailed description, numerous specific details are set forth to provide a full understanding of the present disclosure. It will be apparent, however, to one ordinarily skilled in the art, that the embodiments of the present disclosure may be practiced without some of these specific details. In other instances, well-known structures and techniques have not been shown in detail so as not to obscure the disclosure.

Data security is important for protecting digital data from undesirable destructive events, such as cyberattacks or data breaches. This has become increasingly more important in the modern age, as the world has become more connected and reliant on digital data. Data encryption protects digital data and is an important tool for data security. However, data encryption requires using encryption keys, which may become outdated or otherwise compromised over time. Therefore it is desirable to improve upon conventional data security techniques.

Conventionally, data stored in databases is encrypted for security purposes. The encryption process may include utilization of an encryption key that is often a sealed secret. Encryption keys are randomized strings of information (stored as bits) stored in a file that are used to encode and decode data. The encryption key may be available in the application context, but it is not stored in the same location for security reasons. Sometimes the encryption key needs to be rotated, either in case of the key being compromised, or as part of a periodic rotation for best security practices. Rotation of encryption keys is a set of techniques used to retire encryption keys to ensure its ongoing and persistent security. This may involve decrypting the current data on the database with the old key, and re-encrypting it with the new key. This process is difficult to track as the encryption key is not stored, as storing it would defeat the purpose of encrypting the data in the first place. This process may also include many reads and writes to the database table, which further increases the complexity of rotating the encryption keys to the data.

The subject disclosure addresses shortcomings in conventional cryptography by providing for systems and methods for rotating encryption keys. In an aspect, an encryption rotation request may be received by an application. The application may have either one or more old secrets and/or a new secret available at runtime. The application may hash all the secrets, and may compare the values in an encryption log. If there is no log available, the application may assume that all data is encrypted with the old secret. If there is a log available, the application checks which, if any, data is pending rotation. The application rotates the data by decrypting the database data with the key that matches the encryption log's current secret key hash. The application may then re-encrypt the data with the new secret key. The application may also add a new entry to the encryption log with a hash of the new secret key. According to additional aspects, the rotation of the encryption keys may include a just-in-time (JIT) secret rotation.

The disclosed system addresses a problem in traditional data security tied to computer technology, namely, the technical problem of rotating security keys. The disclosed system solves this technical problem by providing a solution also rooted in computer technology, namely, by providing for rotating encryption keys for encrypted data with minimal downtime/disruption to service. The disclosed system also improves the functioning of the computer itself because it improves the data security of the computer so that the computer will be resilient to cyberattacks and/or data breaches.

FIG. 1 illustrates an exemplary process flow 100 for rotating encryption keys, according to certain aspects of the present disclosure. The process flow 100 may start 102 when a new secret is added 104. For example, the new secret may include a new encryption key that is being added to a database. In an implementation, it is determined whether encryption key rotation has been enabled 106. If no, then the process flow 100 ends 118. If yes, then a secret history table is checked 108.

According to aspects, it is then determined whether there is a log for the new encryption key 110. If yes, then the process flow 100 ends 118. If not, then encrypted data of the database is re-encrypted with the new encryption key 112. For example, the new encryption key may be rotated in to replace an old encryption key that previously encrypted the data. The new encryption key is hashed 114, and an encryption log entry is saved to the database 116. For example, the hash of the new encryption key may be stored in the database. The process flow 100 then ends 118.

According to aspects, the encryption log may be as granular as desired by an administrator. For example, the encryption log may include details for the entire database, an index of a row that has been encrypted so far, or any other details. According to an aspect, the encryption log may include at least one of a table value in the database, a row number of the database, a column number of the database, a timestamp, and/or a state of the database. It is understood that these are exemplary only, and various other database details may be included in the encryption log without departing from the scope of the disclosure.

In this way, the encryption log may maintain a record that tracks encryption keys and their correlated encrypted data. This allows an administrator to know which secret key is currently being used to encrypt certain database data. New encryption keys may also be rotated in to replace the old encryption keys with minimal downtime to the data.

According to aspects, the encryption log may include a state of encryption for the data. The encryption log may also be stored in a database table separate from the data. In an implementation, whenever any rotation is performed, an entry is added to the encryption log with the date, metadata on what was decrypted and/or re-encrypted, and a hash of the old encryption key (e.g., old secret key) as well as a hash of the new encryption key (e.g., new secret key).

By using a hash of the secret key, it may be verified that the encryption key matches the log stored in the database. This allows for storing data about the encryption keys used in the database without compromising the security of the system itself.

According to aspects, in addition to storing the hashes of the encryption keys, the encryption log may also store the table value that each hash is associated with, and also the row number that was encrypted with the secret key. This can be as low level as required, tracking individual rows and columns of a database table, the table in general, or the state of the entire database. It is understood that single files of any nature may also be protected, in addition to database data.

Figure 2:
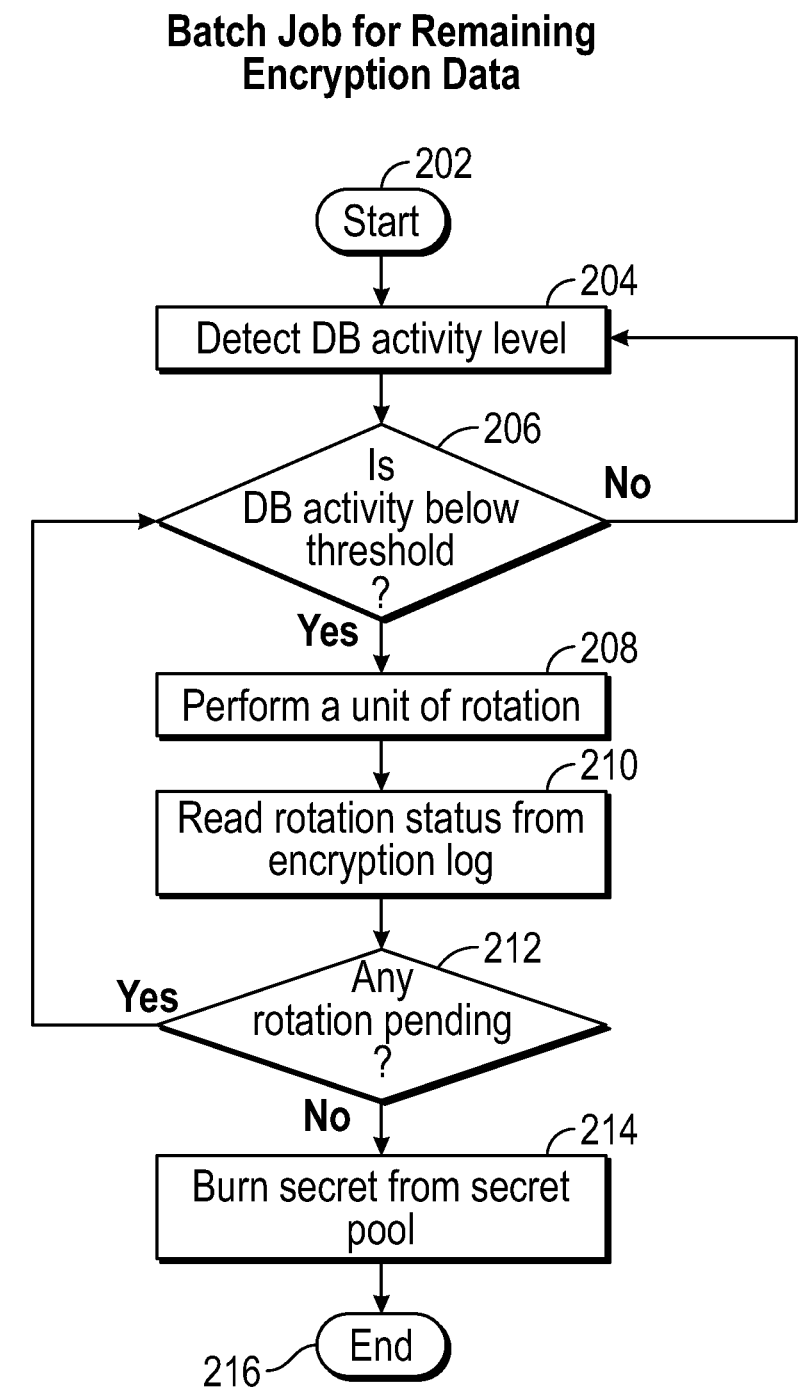
FIG. 2 illustrates another exemplary process flow for rotating encryption keys, according to certain aspects of the present disclosure.

FIG. 2 illustrates another exemplary process flow 200 for rotating encryption keys, according to certain aspects of the present disclosure. For example, the process flow 200 may be for adding a new secret to a pool of currently in-use secrets. In an implementation, the process flow 200 may include a batch job that processes any remaining rotation and burns the secret once it is no longer in use.

According to aspects, the process flow 200 may start 202 by detecting an activity level of a database 204. It may be determined whether the database activity is below a threshold 206. For example, the threshold may be a predetermined threshold by an administrator and/or through artificial intelligence (AI)/machine learning (ML) techniques. In an implementation, the predetermined threshold may be based at least in part on a rate of data reads and/or writes to/from the database. If the database activity is not below the threshold, then the process flow 200 returns to step 204. If the database activity is below the threshold, then a unit of rotation is performed on the data of the database 208. For example, the database activity may include, but is not limited to, wait time, number of queries, CPU usage, memory usage, disk usage, sessions, query latency, number of active connections, and the like.

According to aspects, a rotation status may be read from an encryption log 210. It may be determined whether any rotations are pending 212. If yes, then the process flow 200 returns to step 206. If no, then the secret (e.g., the encryption key) is burned from a secret pool (e.g., encryption key pool) 214 and the process flow ends 216.

According to aspects, the data rotation may include a just-in-time (JIT) secret rotation of a majority of the data. For example, once a new secret is added, it may be added to the application context alongside all the other old secrets that have been used to encrypt data in the database. Henceforth, whenever an encrypted data value in the database is read, the last modified timestamp will be inspected and compared to the encryption log to determine which secret key it was encrypted with. Additionally, whenever an encrypted data value is updated, the new value is encrypted with the new key, and a log is added to the encryption log.

According to aspects, the database activity may be monitored by the application and when the activity (e.g., for the entire database, for a certain table, etc.) falls below a certain threshold, then a batch job is invoked to begin rotating the remaining data until it is either complete, or the database activity unrelated to the rotation exceeds a certain threshold again.

According to aspects, the key rotation may be increased if suspicious/uncommon database activity is detected. For example, policies may be defined such that if suspicious activity (e.g., database activity not aligned with day-to-day activity, etc.) is detected, the key rotation may be increased.

According to aspects, the application may monitor the database across microservices and the network, and may emit alerts when a security threat is detected. For example, the alerts may include events which are then picked up by pertinent microservices who in turn may begin to adjust their thresholds for data rotation accordingly. In an implementation, artificial intelligence (AI)/machine learning (ML) based monitoring may be utilized to detect security threats and trigger alerts to prioritize encryption rotation.

In this way, encrypted data may be rotated with new encryption keys on database tables that are under heavy usage with minimal disruption. For example, a majority of the database table may be rotated without interfering with performance and locking out the table for other read/writes.

Figure 3A:
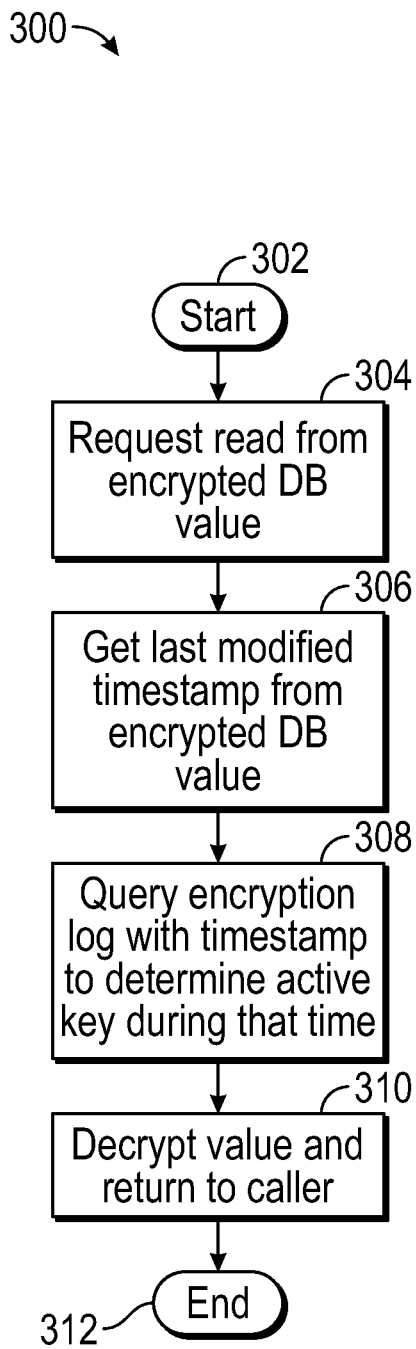
FIG. 3A illustrates an exemplary read flow for a database, in accordance with one or more implementations.

FIG. 3A illustrates an exemplary read flow 300 for a database, in accordance with one or more implementations. For example, the read flow 300 may include rotating secrets just-in-time during read operations to a database.

According to aspects, the read flow 300 may start 302 with a request to read from a database of encrypted values (e.g., encrypted data) 304. For example, a specific encrypted database value may be requested to be read. A last modified timestamp may be retrieved from the database regarding the specific encrypted database value 306. An encryption log may be queried with the timestamp to determine an active key during that time 308. The specific encrypted database value may be decrypted and returned to the caller 310, and the read flow 300 may end 312.

Figure 3B:
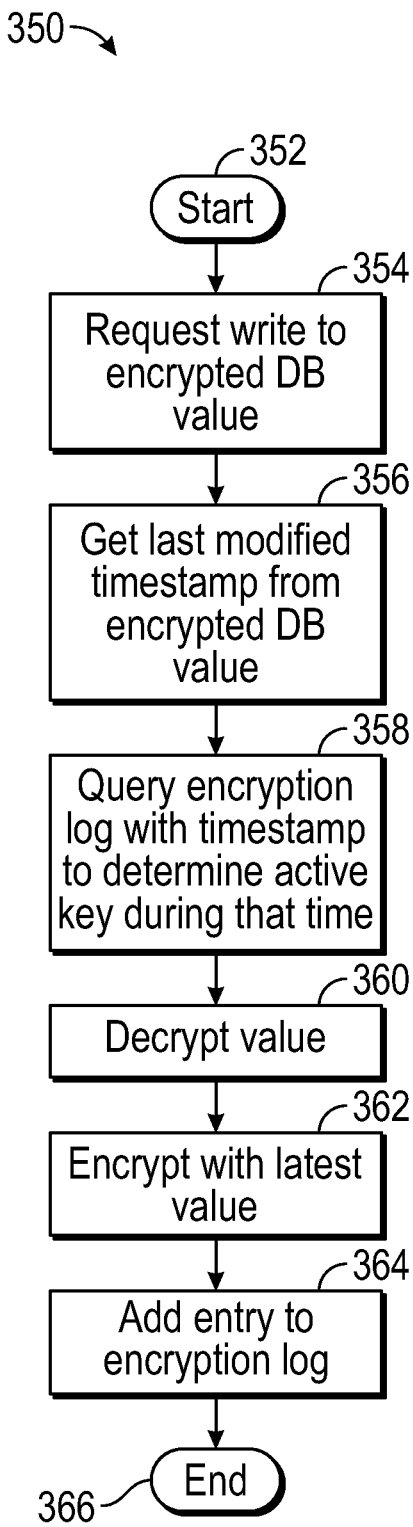
FIG. 3B illustrates an exemplary write flow for a database, in accordance with one or more implementations

FIG. 3B illustrates an exemplary write flow 350 for a database, in accordance with one or more implementations. For example, the write flow 350 may include rotating secrets just-in-time during write operations to a database According to aspects, the write flow 350 may start 352 with a request to write to an encrypted database value 354. A last modified timestamp may be retrieved from an encrypted database value 356. An encryption log may be queried with the timestamp to determine an active key during that time 358. The encrypted database value may be decrypted 360. The database value may then be encrypted with a latest value (e.g., via a new encryption key) 362. A new entry may then be added to the encryption log 364 regarding the latest value. The write flow 350 may then end 366.

According to additional aspects, AI/ML techniques may be utilized to determine when encryption rotation may occur. For example, a supervised machine learning algorithm (e.g., a neural network) may be trained to identify security threats based on abnormal database activity, including, but not limited to, wait time, number of queries, CPU usage, memory usage, disk usage, sessions, query latency, number of active connections, etc. In an implementation, the training may utilize sets of training data that include examples of abnormal database activity to train the ML algorithm on acceptable thresholds of database activity.

Once trained, the ML algorithm may be deployed so that encryption rotation occurs whenever abnormal database activity is detected. Similarly, the ML algorithm may also be trained to identify situations where encryption rotation may be paused/slowed down so that the rotation does not interfere with performance of the database (e.g., locking out database tables for other read/writes, etc.).

According to aspects, the ML algorithm may be occasionally re-trained. For example, the re-training may be based on a cadence (e.g., monthly, every two months, etc.) and/or a performance of the ML algorithm (e.g., re-train if performance falls below a threshold). In an implementation, the ML algorithm may be retrained when/prior to a new software patch is/will be released.

Figure 4:
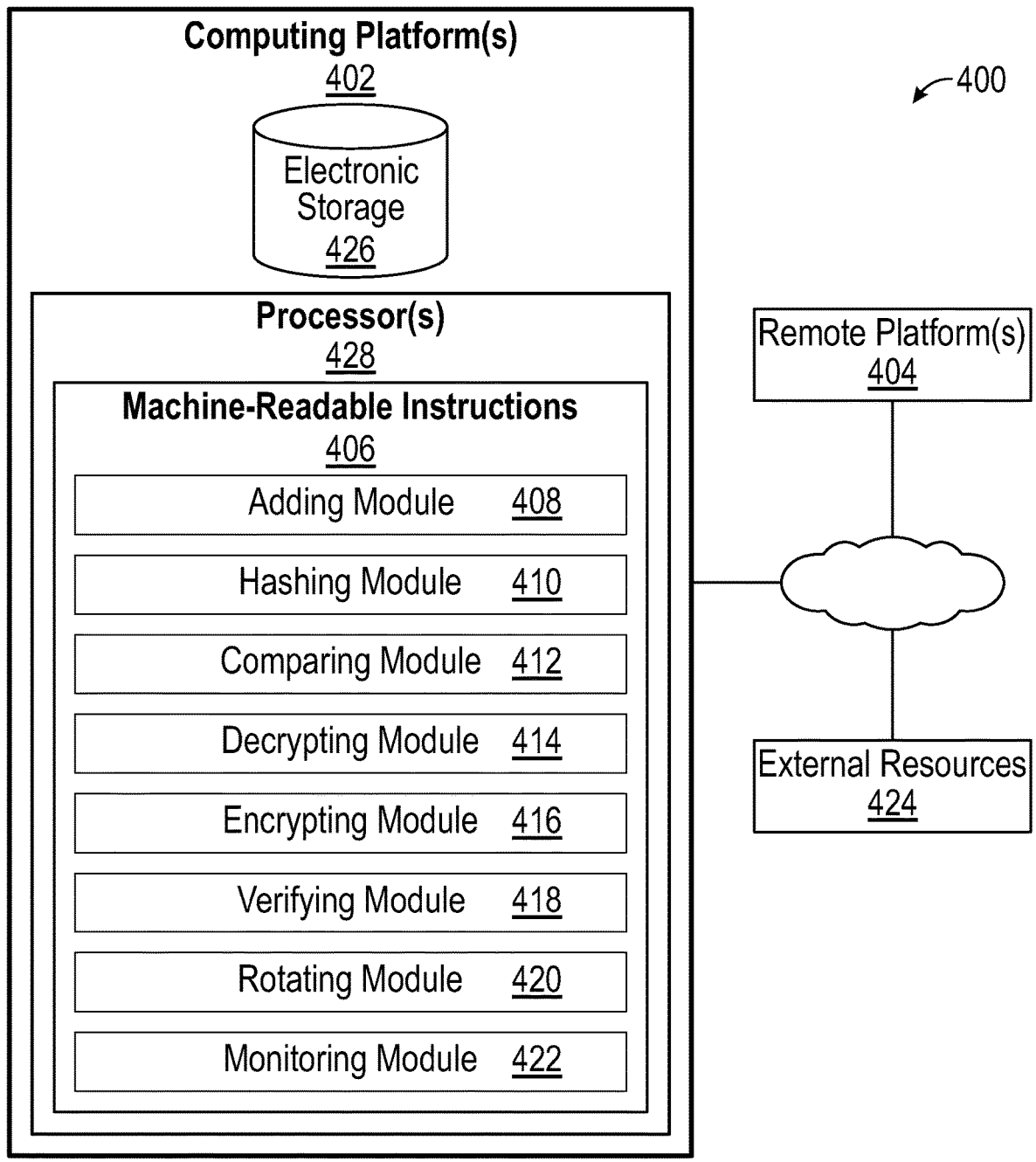
FIG. 4 illustrates a system configured for rotating encryption keys, in accordance with one or more implementations.

FIG. 4 illustrates a system 400 configured for rotating encryption keys, in accordance with one or more implementations. In some implementations, system 400 may include one or more computing platforms 402. Computing platform(s) 402 may be configured to communicate with one or more remote platforms 404 according to a client/server architecture, a peer-to-peer architecture, and/or other architectures. Remote platform(s) 404 may be configured to communicate with other remote platforms via computing platform(s) 402 and/or according to a client/server architecture, a peer-to-peer architecture, and/or other architectures. Users may access system 400 via remote platform(s) 404.

Computing platform(s) 402 (e.g., the compliance engine) may be configured by machine-readable instructions 406. Machine-readable instructions 406 may include one or more instruction modules. The instruction modules may include computer program modules. The instruction modules may include one or more of adding module 408, hashing module 410, comparing module 412, decrypting module 414, encrypting module 416, verifying module 418, rotating module 420, and/or monitoring module 422, and/or other instruction modules.

Adding module 408 may be configured to add a new encryption key for encrypting and/or decrypting data of a database. According to aspects, the data may have been previously encrypted by an old encryption key. Adding module 408 may also be configured to add a new entry into an encryption log. For example, the new entry may include a new hash.

Hashing module 410 may be configured to hash the new encryption key to generate a new hash.

Comparing module 412 may be configured to compare the new hash and an old hash with values in an encryption log. According to aspects, the old hash may be generated by hashing an old encryption key.

Decrypting module 414 may be configured to decrypt the data with the old encryption key when the new hash and old hash match the values in the encryption log. According to aspects, the decrypting may be in response to the comparison of the new hash and the old hash.

Encrypting module 416 may be configured to encrypt the data with the new encryption key.

Verifying module 418 may be configured to verify that the new hash and the old hash match recorded corresponding values in the encryption log.

Rotating module 420 may be configured to rotate data of a database with new encryption keys.

Monitoring module 422 may be configured to monitor an activity level of a database.

In some implementations, computing platform(s) 402, remote platform(s) 404, and/or external resources 424 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 402, remote platform(s) 404, and/or external resources 424 may be operatively linked via some other communication media.

A given remote platform 404 may include one or more processors configured to execute computer program modules. The computer program modules may be configured to enable an expert or user associated with the given remote platform 404 to interface with system 400 and/or external resources 424, and/or provide other functionality attributed herein to remote platform(s) 404. By way of non-limiting example, a given remote platform 404 and/or a given computing platform 402 may include one or more of a server, a desktop computer, a laptop computer, a handheld computer, a tablet computing platform, a Netbook, a Smartphone, a gaming console, and/or other computing platforms.

External resources 424 may include sources of information outside of system 400, external entities participating with system 400, and/or other resources. In some implementations, some or all of the functionality attributed herein to external resources 424 may be provided by resources included in system 400.

Computing platform(s) 402 may include electronic storage 426, one or more processors 428, and/or other components. Computing platform(s) 402 may include communication lines, or ports, to enable the exchange of information with a network and/or other computing platforms. Illustration of computing platform(s) 402 in FIG. 4 is not intended to be limiting. Computing platform(s) 402 may include a plurality of hardware, software, and/or firmware components operating together to provide the functionality attributed herein to computing platform(s) 402. For example, computing platform(s) 402 may be implemented by a cloud of computing platforms operating together as computing platform(s) 402.

Electronic storage 426 may comprise non-transitory storage media that electronically stores information. The electronic storage media of electronic storage 426 may include one or both of system storage that is provided integrally (i.e., substantially non-removable) with computing platform(s) 402 and/or removable storage that is removably connectable to computing platform(s) 402 via, for example, a port (e.g., a USB port, a firewire port, etc.) or a drive (e.g., a disk drive, etc.). Electronic storage 426 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 426 may include one or more virtual storage resources (e.g., cloud storage, a virtual private network, and/or other virtual storage resources). Electronic storage 426 may store software algorithms, information determined by processor(s) 428, information received from computing platform(s) 402, information received from remote platform(s) 404, and/or other information that enables computing platform(s) 402 to function as described herein.

Processor(s) 428 may be configured to provide information processing capabilities in computing platform(s) 402. As such, processor(s) 428 may include one or more of a digital processor, an analog processor, a digital circuit designed to process information, an analog circuit designed to process information, a state machine, and/or other mechanisms for electronically processing information. Although processor(s) 428 is shown in FIG. 4 as a single entity, this is for illustrative purposes only. In some implementations, processor(s) 428 may include a plurality of processing units. These processing units may be physically located within the same device, or processor(s) 428 may represent processing functionality of a plurality of devices operating in coordination. Processor(s) 428 may be configured to execute modules 408, 410, 412, 414, 416, 418, 420, and/or 422, and/or other modules. Processor(s) 428 may be configured to execute modules 408, 410, 412, 414, 416, 418, 420, and/or 422, and/or other modules by software, hardware, firmware, some combination of software, hardware, and/or firmware, and/or other mechanisms for configuring processing capabilities on processor(s) 428. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 408, 410, 412, 414, 416, 418, 420, and/or 422 are illustrated in FIG. 4 as being implemented within a single processing unit, in implementations in which processor(s) 428 includes multiple processing units, one or more of modules 408, 410, 412, 414, 416, 418, 420, and/or 422 may be implemented remotely from the other modules. The description of the functionality provided by the different modules 408, 410, 412, 414, 416, 418, 420, and/or 422 described below is for illustrative purposes, and is not intended to be limiting, as any of modules 408, 410, 412, 414, 416, 418, 420, and/or 422 may provide more or less functionality than is described. For example, one or more of modules 408, 410, 412, 414, 416, 418, 420, and/or 422 may be eliminated, and some or all of its functionality may be provided by other ones of modules 408, 410, 412, 414, 416, 418, 420, and/or 422. As another example, processor(s) 428 may be configured to execute one or more additional modules that may perform some or all of the functionality attributed below to one of modules 408, 410, 412, 414, 416, 418, 420, and/or 422.

The techniques described herein may be implemented as method(s) that are performed by physical computing device(s); as one or more non-transitory computer-readable storage media storing instructions which, when executed by computing device(s), cause performance of the method(s); or, as physical computing device(s) that are specially configured with a combination of hardware and software that causes performance of the method(s).

Figure 5:
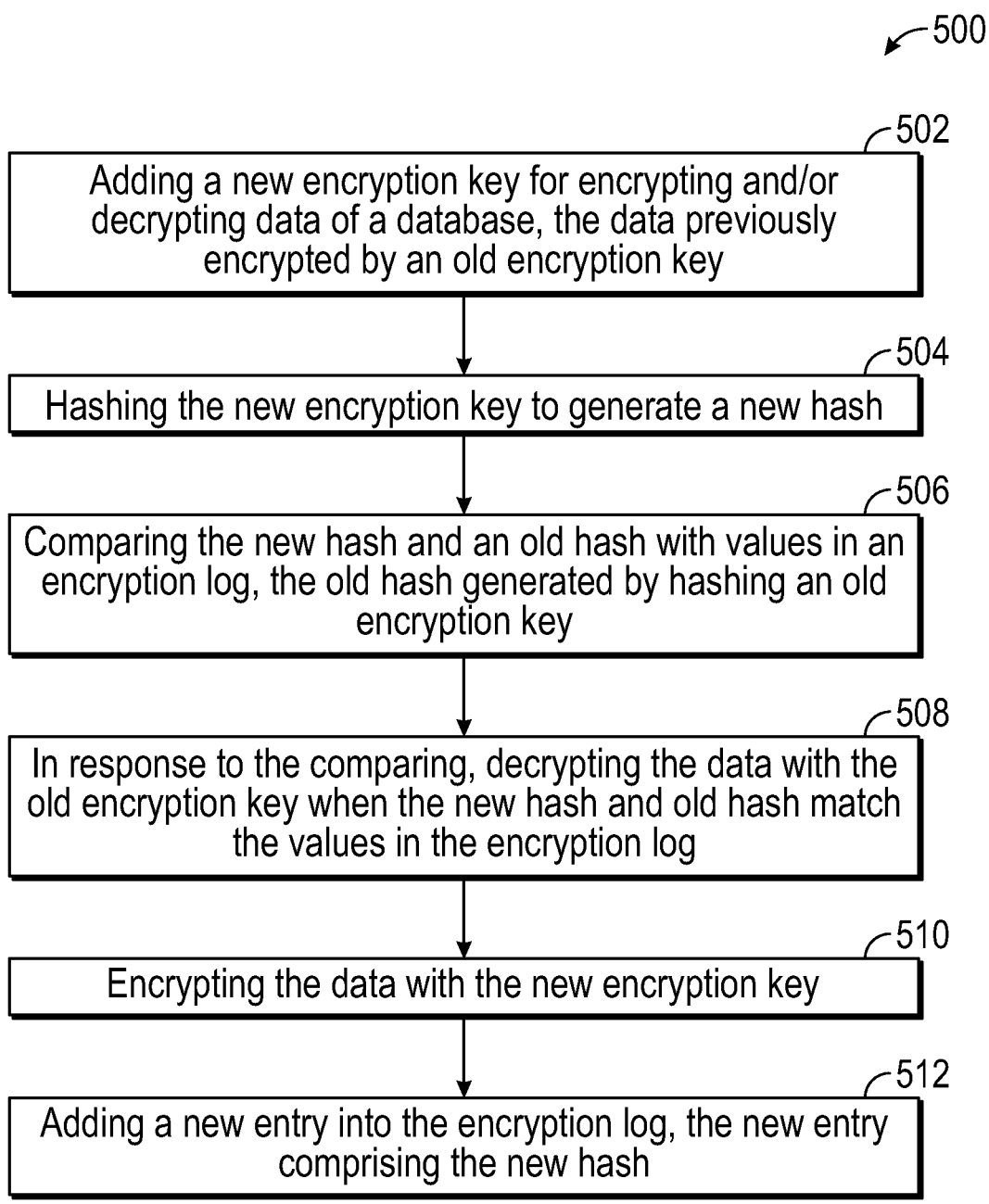
FIG. 5 illustrates an example flow diagram for rotating encryption keys, according to certain aspects of the present disclosure.

FIG. 5 illustrates an example flow diagram (e.g., process 500) for compliance training, according to certain aspects of the disclosure. For explanatory purposes, the example process 500 is described herein with reference to FIGS. 1-4. Further for explanatory purposes, the steps of the example process 500 are described herein as occurring in serial, or linearly. However, multiple instances of the example process 500 may occur in parallel. For purposes of explanation of the subject technology, the process 500 will be discussed in reference to FIGS. 1-4.

At step 502, a new encryption key for encrypting and/or decrypting data of a database is added. According to aspects, the data may have been previously encrypted by an old encryption key.

At step 504, the new encryption key is hashed to generate a new hash.

At step 506, the new hash and an old hash are compared with values in an encryption log. According to aspects, the old hash may be generated by hashing an old encryption key.

At step 508, in response to the comparing, the data may be decrypted with the old encryption key when the new hash and old hash match the values in the encryption log.

At step 510, the data is encrypted with the new encryption key.

At step 512, a new entry is added into the encryption log. According to aspects, the new entry may include the new hash.

For example, as described above in relation to FIGS. 1-4, at step 502, a new encryption key for encrypting and/or decrypting data of a database is added (e.g., step 104 of FIG. 1). According to aspects, the data may have been previously encrypted by an old encryption key. At step 504, the new encryption key is hashed to generate a new hash (e.g., step 114 of FIG. 1). At step 506, the new hash and an old hash are compared with values in an encryption log (e.g., via comparing module 412). According to aspects, the old hash may be generated by hashing an old encryption key. At step 508, in response to the comparing, the data may be decrypted with the old encryption key when the new hash and old hash match the values in the encryption log (e.g., step 310 of FIG. 3A, step 360 of FIG. 3B). At step 510, the data is encrypted with the new encryption key (e.g., step 112 of FIG. 1, step 208 of FIG. 2, step 362 of FIG. 3B). At step 512, a new entry is added into the encryption log (e.g., step 364 of FIG. 3B). According to aspects, the new entry may include the new hash (e.g., step 116 of FIG. 1).

According to an aspect, the process 500 may further include causing output of the data to an output of a computer. For example, the output may include a display (e.g., a monitor), a printer, etc.

According to an aspect, the process 500 may further include verifying the new hash and the old hash match the values in the encryption.

According to an aspect, the encryption log may include at least one of a table value in the database, a row number of the database, a column number of the database, a timestamp, and/or a state of the database.

According to an aspect, the data, the new encryption key, and the old encryption key are stored in the database.

According to an aspect, the process 500 may further include rotating data of a database with new encryption keys.

According to an aspect, the process 500 may further include training a machine learning (ML) algorithm to identify abnormal activity of a database. The process 500 may further include monitoring an activity level of a database. The process 500 may also include determining, through the ML algorithm, whether the activity level of the database is abnormal. The process 500 may also include, in response to determining that the activity level of the database is abnormal, rotating the data to be encrypted by the new encryption key.

According to an aspect, the process 500 may also include rotating the data to be encrypted by the new encryption key when the activity level of the database falls below a predefined threshold.

According to an aspect, the rotating pauses if the activity level rises above the predefined threshold.

According to an aspect, the rotating may increase if suspicious activity is detected. For example, a policy may be set that utilizes the rotation as a stopgap if activity is abnormal (e.g., activity is too high or too low based on historical data and/or relevant predetermined thresholds, such as in a distributed denial-of-service (DDOS) attack, abnormal increase in password reset requests, failed logins, etc.). This may be combined with ML/AI-based monitoring to automate the key rotation. In this way, the process 500 may deliberately direct pre-configured actions and/or make recommendations to any kind of action.

According to an aspect, the process 500 may further include burning the new encryption key after encrypting the data. For example, the burning may include discarding, destroying, etc.

According to an aspect, the process 500 may further include receiving a read request for encrypted data. The process 500 may also include retrieving a timestamp from the encryption log of when the encrypted data was last modified. The process 500 may also include querying the encryption log with the timestamp to determine an active encryption key during that time. The process 500 may also include decrypting the encrypted data with the active encryption key.

According to an aspect, the process 500 may further include receiving a write request for encrypting data. The process 500 may also include retrieving a timestamp from the encryption log of when the data was last modified. The process 500 may also include querying the encryption log with the timestamp to determine an active encryption key during that time. The process 500 may also include decrypting the data with the active encryption key. The process 500 may also include encrypting the data with the new encryption key. The process 500 may also include, in response to the encrypting, adding a new entry into the encryption log regarding the encrypting.

Figure 6:
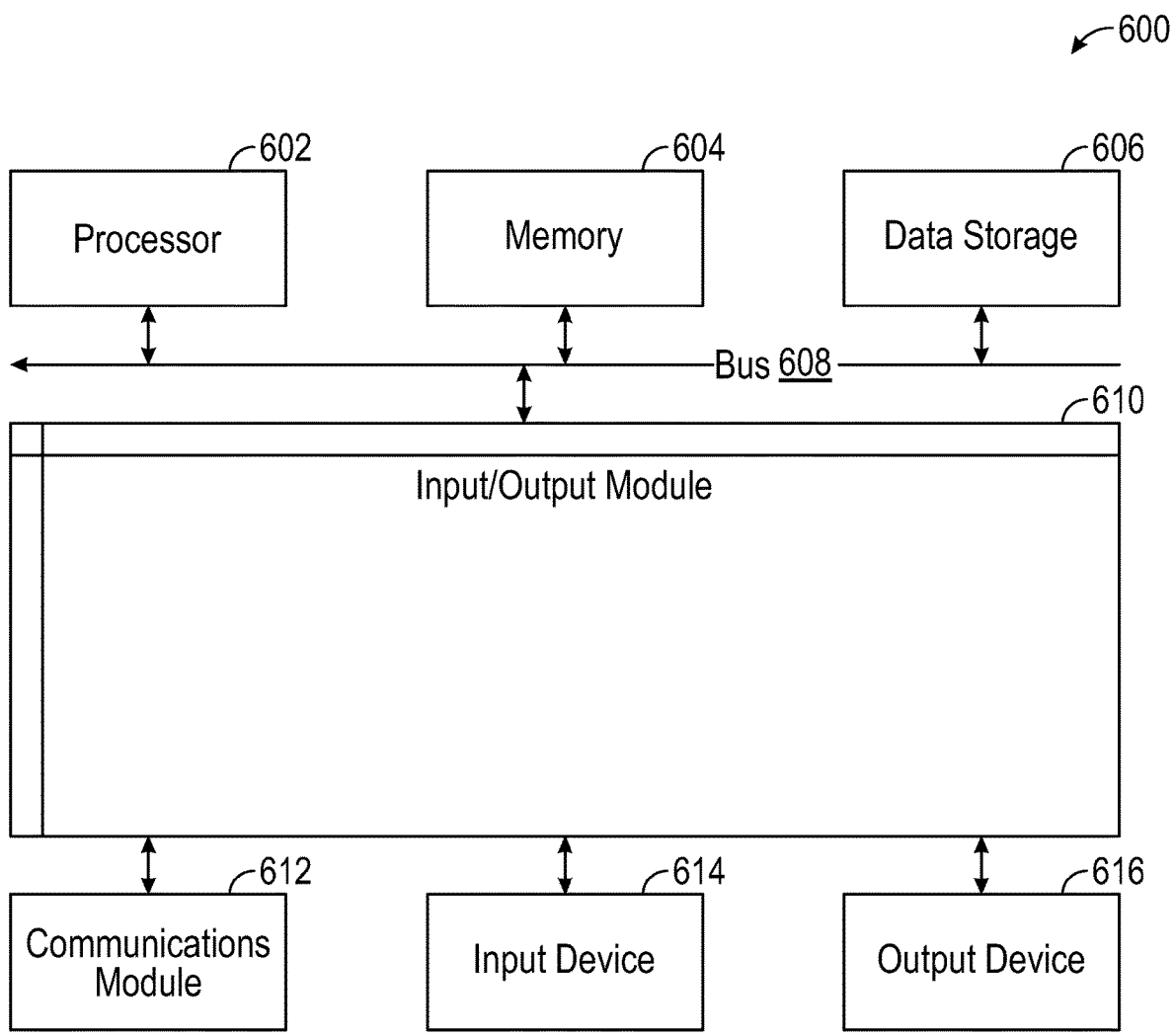
FIG. 6 is a block diagram illustrating an example computer system (e.g., representing both client and server) with which aspects of the subject technology can be implemented.

FIG. 6 is a block diagram illustrating an exemplary computer system 600 with which aspects of the subject technology can be implemented. In certain aspects, the computer system 600 may be implemented using hardware or a combination of software and hardware, either in a dedicated server, integrated into another entity, or distributed across multiple entities.

Computer system 600 (e.g., server and/or client) includes a bus 608 or other communication mechanism for communicating information, and a processor 602 coupled with bus 608 for processing information. By way of example, the computer system 600 may be implemented with one or more processors 602. Processor 602 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 600 can include, in addition to hardware, code that creates an execution environment for the computer program in question, e.g., code that constitutes processor firmware, a protocol stack, a database management system, an operating system, or a combination of one or more of them stored in an included memory 604, such as a Random Access Memory (RAM), a flash memory, a Read-Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, i.e., one or more modules of computer program instructions encoded on a computer-readable medium for execution by, or to control the operation of, the computer system 600, and according to any method well-known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 604 may also be used for storing temporary variable or other intermediate information during execution of instructions to be executed by processor 602.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Exemplary input/output modules 610 include data ports such as USB ports. The input/output module 610 is configured to connect to a communications module 612. Exemplary communications modules 612 include networking interface cards, such as Ethernet cards and modems. In certain aspects, the input/output module 610 is configured to connect to a plurality of devices, such as an input device 614 and/or an output device 616. Exemplary input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Exemplary output devices 616 include display devices such as an LCD (liquid crystal display) monitor, for displaying information to the user.

According to one aspect of the present disclosure, the above-described systems can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in the main memory 604 causes processor 602 to perform the process steps described herein. One or more processors in a multi-processing arrangement may also be employed to execute the sequences of instructions contained in memory 604. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., such as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network can include, for example, any one or more of a LAN, a WAN, the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computer system 600 can include clients and servers. A client and server are generally remote from each other and typically interact through a communication network. The relationship of client and server arises by virtue of computer programs running on the respective computers and having a client-server relationship to each other. Computer system 600 can be, for example, and without limitation, a desktop computer, laptop computer, or tablet computer. Computer system 600 can also be embedded in another device, for example, and without limitation, a mobile telephone, a PDA, a mobile audio player, a Global Positioning System (GPS) receiver, and/or a television set top box.

The term "machine-readable storage medium" or "computer-readable medium" as used herein refers to any medium or media that participates in providing instructions to processor 602 for execution. Such a medium may take many forms, including, but not limited to, non-volatile media, volatile media, and transmission media. Non-volatile media include, for example, optical or magnetic disks, such as data storage device 606. Volatile media include dynamic memory, such as memory 604. Transmission media include coaxial cables, copper wire, and fiber optics, including the wires that comprise bus 608. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As the user computing system 600 reads data, information may be read from the data and stored in a memory device, such as the memory 604. Additionally, data from the memory 604 servers accessed via a network, the bus 608, or the data storage 606 may be read and loaded into the memory 604. Although data is described as being found in the memory 604, it will be understood that data does not have to be stored in the memory 604 and may be stored in other memory accessible to the processor 602 or distributed among several media, such as the data storage 606.

As used herein, the phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

To the extent that the terms "include," "have," or the like is used in the description or the claims, such term is intended to be inclusive in a manner similar to the term "comprise" as "comprise" is interpreted when employed as a transitional word in a claim. The word "exemplary" is used herein to mean "serving as an example, instance, or illustration." Any embodiment described herein as "exemplary" is not necessarily to be construed as preferred or advantageous over other embodiments.

A reference to an element in the singular is not intended to mean "one and only one" unless specifically stated, but rather "one or more." All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products. Other variations are within the scope of the following claims.

What is claimed is:

1. A computer-implemented method for encrypting data, comprising:
   adding a new encryption key for encrypting and/or decrypting data of a database, the data previously encrypted by an old encryption key;
   hashing the new encryption key to generate a new hash;
   comparing the new hash and an old hash with values in an encryption log, the old hash generated by hashing the old encryption key;
   in response to the comparing, decrypting the data with the old encryption key when the new hash and the old hash match the values in the encryption log;
   encrypting the data with the new encryption key; and
   adding a new entry into the encryption log, the new entry comprising the new hash and a state of encryption for the data,
   wherein the encryption log is stored in a database table separate from the data.

2. The computer-implemented method of claim 1, further comprising: verifying the new hash and the old hash match the values in the encryption log.

3. The computer-implemented method of claim 1, wherein the encryption log comprises at least one of a table value in the database, a row number of the database, a column number of the database, a timestamp, and/or a state of the database.

4. The computer-implemented method of claim 1, wherein the data, the new encryption key, and the old encryption key are stored in the database.

5. The computer-implemented method of claim 1, further comprising: rotating data of the database with new encryption keys.

6. The computer-implemented method of claim 1, further comprising:
   training a machine learning (ML) algorithm to identify abnormal activity of the database;
   monitoring an activity level of the database;
   determining, through the ML algorithm, whether the activity level of the database is abnormal; and
   in response to determining that the activity level of the database is abnormal, rotating the data to be encrypted by the new encryption key.

7. The computer-implemented method of claim 6, wherein the rotating pauses if the activity level rises above a predefined threshold.

8. The computer-implemented method of claim 1, further comprising:
   burning the new encryption key after encrypting the data.

9. The computer-implemented method of claim 1, further comprising:
   receiving a read request for encrypted data;
   retrieving a timestamp from the encryption log of when the encrypted data was last modified;
   querying the encryption log with the timestamp to determine an active encryption key during that time; and
   decrypting the encrypted data with the active encryption key.

10. The computer-implemented method of claim 1, further comprising:
    receiving a write request for encrypting data;
    retrieving a timestamp from the encryption log of when the data was last modified;
    querying the encryption log with the timestamp to determine an active encryption key during that time;
    decrypting the data with the active encryption key;
    encrypting the data with the new encryption key; and
    in response to the encrypting, adding a new entry into the encryption log regarding the encrypting.

11. A system for encrypting data, comprising:
    a processor; and
    a memory comprising instructions stored thereon, which when executed by the processor, causes the processor to perform:
       adding a new encryption key for encrypting and/or decrypting data of a database, the data previously encrypted by an old encryption key;
       hashing the new encryption key to generate a new hash;
       comparing the new hash and an old hash with values in an encryption log, the old hash generated by hashing the old encryption key;
       in response to the comparing, decrypting the data with the old encryption key when the new hash and the old hash match the values in the encryption log;
       encrypting the data with the new encryption key; and
       adding a new entry into the encryption log, the new entry comprising the new hash and a state of encryption for the data,
       wherein the encryption log is stored in a database table separate from the data.

12. The system of claim 11, further comprising stored sequences of instructions, which when executed by the processor, cause the processor to perform:
    verifying the new hash and the old hash match the values in the encryption log.

13. The system of claim 11, wherein the encryption log comprises at least one of a table value in the database, a row number of the database, a column number of the database, a timestamp, and/or a state of the database.

14. The system of claim 11, wherein the data, the new encryption key, and the old encryption key are stored in the database.

15. The system of claim 11, further comprising stored sequences of instructions, which when executed by the processor, cause the processor to perform:
    rotating data of the database with new encryption keys.

16. The system of claim 11, further comprising stored sequences of instructions, which when executed by the processor, cause the processor to perform:
    training a machine learning (ML) algorithm to identify abnormal activity of the database;
    monitoring an activity level of the database;
    determining, through the ML algorithm, whether the activity level of the database is abnormal; and
    in response to determining that the activity level of the database is abnormal, rotating the data to be encrypted by the new encryption key.

17. The system of claim 16, wherein the rotating pauses if the activity level rises above a predefined threshold.

18. The system of claim 11, further comprising stored sequences of instructions, which when executed by the processor, cause the processor to perform:
    burning the new encryption key after encrypting the data.

19. A non-transitory computer-readable storage medium having instructions stored thereon that, when executed by one or more processors, cause the one or more processors to perform operations for encrypting data, the operations comprising:
    adding a new encryption key for encrypting and/or decrypting data of a database, the data previously encrypted by an old encryption key;

hashing the new encryption key to generate a new hash;
comparing the new hash and an old hash with values in an encryption log, the old hash generated by hashing the old encryption key;
in response to the comparing, decrypting the data with the old encryption key when the new hash and the old hash match the values in the encryption log;
encrypting the data with the new encryption key; and
adding a new entry into the encryption log, the new entry comprising the new hash and a state of encryption for the data,
wherein the encryption log is stored in a database table separate from the data.

20. The non-transitory computer-readable storage medium of claim 19, wherein the encryption log comprises at least one of a table value in the database, a row number of the database, a column number of the database, a timestamp, and/or a state of the database.

* * * * *